Figure 1:
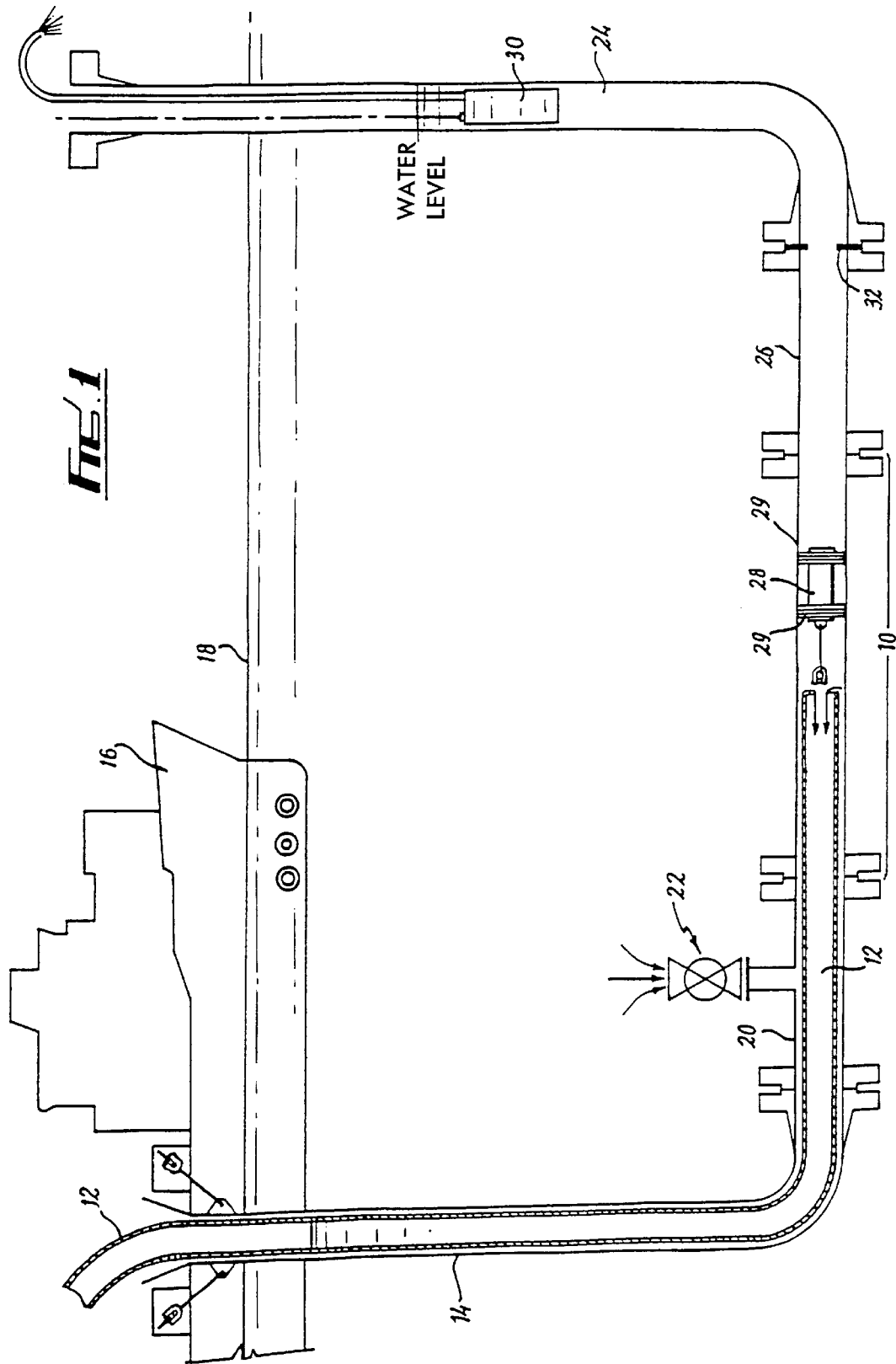

United States Patent
Cruickshank

[19]

[11] Patent Number: 6,109,829
[45] Date of Patent: Aug. 29, 2000

[54] PIPELINE PIGGING

[75] Inventor: John Duncan Cruickshank, Kincardinshire, United Kingdom

[73] Assignee: Coflexip Stena Offshore Ltd., United Kingdom

[21] Appl. No.: 09/043,592

[22] PCT Filed: Sep. 20, 1996

[86] PCT No.: PCT/GB96/02318

§ 371 Date: Aug. 20, 1998

§ 102(e) Date: Aug. 20, 1998

[87] PCT Pub. No.: WO97/10943

PCT Pub. Date: Mar. 27, 1997

[30] Foreign Application Priority Data

Sep. 21, 1995 [GB] United Kingdom .................. 9519247

[51] Int. Cl.[7] ........................................ F16L 1/12
[52] U.S. Cl. .................... 405/169; 405/158; 405/171
[58] Field of Search .................................. 405/154, 146, 405/150.1; 254/134.4; 156/287, 294; 138/98

[56] References Cited

U.S. PATENT DOCUMENTS

| | | | |
|---|---|---|---|
| 2,794,758 | 6/1957 | Harper et al. | 156/287 |
| 3,494,813 | 2/1970 | Lawrence et al. | 405/150.1 X |
| 3,662,045 | 5/1972 | Tierling | 405/146 X |
| 4,202,531 | 5/1980 | Hamrick | 254/134.4 |
| 4,360,290 | 11/1982 | Ward | 405/170 |
| 4,456,401 | 6/1984 | Williams | 405/150.1 |
| 4,596,381 | 6/1986 | Hamrick | 254/134.4 |
| 4,773,450 | 9/1988 | Stanley | 138/98 |
| 4,840,352 | 6/1989 | Ellis | 254/134.4 |
| 4,848,734 | 7/1989 | Ford | 254/134.4 |
| 4,867,921 | 9/1989 | Steketee | 156/287 X |
| 5,486,332 | 1/1996 | Kamiyama et al. | 264/516 |

FOREIGN PATENT DOCUMENTS

| | | |
|---|---|---|
| 0480771 | 4/1992 | European Pat. Off. . |
| 0593264 | 4/1994 | European Pat. Off. . |
| 2597782 | 10/1987 | France . |
| 2662621 | 12/1991 | France . |
| 994856 | 2/1983 | U.S.S.R. . |

OTHER PUBLICATIONS

Database WPI, Section PQ, Week 8350, Derwent Publications Ltd., London, Great Britain, Class Q67, AN 83–842868, SU 994856.

"Underwater Gamble Pays Off", The Oil & Gas Journal, vol. 57, No. 4, Jan. 26, 1959, p. 105.

*Primary Examiner*—Dennis L. Taylor
*Attorney, Agent, or Firm*—Ostrolenk, Faber, Gerb & Soffen, LLP

[57] ABSTRACT

A system for transporting a pig (28) along the interior of a pipeline (26), particularly for the purpose of installing a liner (12) in the pipeline by towing the liner behind the pig, in which a hydrostatic head is applied on either side of the pig and the head on the downstream side of the pig is reduced such that the pig is transported along the interior of the pipeline by the resultant pressure differential. Where the system is employed in a pre-existing subsea pipeline, the hydrostatic heads may be applied by means of risers (14, 24) and the pressure differential created by means of a pump (30) adapted to pump water out of the downstream riser (24). The liner may be pulled through a flooded pipe by means of a pig, cable, self-propelled pipe crawler, or by combinations of these. A further cable may also be employed to apply a back tension, and/or to limit the pulling force applied to the liner and/or to enable the liner to be pulled backwards.

22 Claims, 2 Drawing Sheets

PIPELINE PIGGING

The present invention relates to improved methods and apparatus for transporting a pig along the interior of a pipeline or the like, particularly but not exclusively a subsea pipeline. In its preferred form, the invention is particularly applicable to the use of a pig for the purpose of installing a liner, typically of polymer material, in an existing pipeline.

In accordance with a first aspect of the invention, there is provided a method for installing a liner in a pipeline, comprising the steps of flooding the interior of the pipeline and pulling the liner along the length of the interior of the pipeline from an upstream end thereof to a downstream end.

Preferably, said liner is pulled by means of a pig which forms a substantially fluid-tight seal with the interior walls of the pipeline and in which a hydrostatic head is applied on either side of the pig, the method comprising reducing the hydrostatic head on a downstream side of the pig such that the hydrostatic head on said downstream side is less than the hydrostatic head on an upstream side of the pig, whereby said liner is transported along at least part of said pipeline by the resultant pressure differential between said upstream and downstream sides of said pig.

Preferably also, said pipeline is an existing subsea pipeline, an inlet riser is connected to the upstream end of the pipeline in which the liner is to be installed, and an outlet riser is connected to the downstream end of the pipeline, said risers each extending to the water surface and said risers and the pipeline being open to hydrostatic pressure, the pig is introduced into the inlet riser, and said pressure differential is created by pumping water out of said outlet riser.

In accordance with a second aspect of the invention, there is provided apparatus for installing a liner in a pipeline, comprising means flooding the interior of the pipeline and pulling means for pulling the liner along the length of the interior of the pipeline from an upstream end thereof to a downstream end.

Preferably, said pulling means comprises a pig having fluid seal means adapted to form a substantially fluid-tight seal with the interior walls of the pipeline, means for applying a hydrostatic head on either side of the pig, and means for reducing the hydrostatic head on a downstream side of the pig such that the hydrostatic head on said downstream side is less than the hydrostatic head on an upstream side of the pig, whereby the liner may be pulled along at least part of said pipeline by the resultant pressure differential between said upstream and downstream sides of said pig.

Preferably also, said pipeline is an existing subsea pipeline, and said means for applying a hydrostatic head on either side of the pig includes an inlet riser adapted to be connected to the upstream end of the pipeline in which the liner is to be installed, and an outlet riser adapted to be connected to the downstream end of the pipeline, said risers each extending to the water surface and said risers and the pipeline being open to hydrostatic pressure, in use, the pig being adapted to be introduced into the inlet riser, and further including pump means for creating said pressure differential by pumping water out of said outlet riser.

In accordance with a third aspect of the invention, there is provided a method for transporting a pig along the interior of a pipeline, in which the pig forms a substantially fluid-tight seal with the interior walls of the pipeline and in which a hydrostatic head is applied on either side of the pig, the method comprising reducing the hydrostatic head on a downstream side of the pig such that the hydrostatic head on said downstream side is less than the hydrostatic head on an upstream side of the pig, whereby said pig is transported along at least part of said pipeline by the resultant pressure differential between said upstream and downstream sides thereof.

In accordance with a fourth aspect of the invention, there is provided apparatus for transporting a pig along the interior of a pipeline, comprising a pig having fluid seal means adapted to form a substantially fluid-tight seal with the interior walls of the pipeline, means for applying a hydrostatic head on either side of the pig, and means for reducing the hydrostatic head on a downstream side of the pig such that the hydrostatic head on said downstream side is less than the hydrostatic head on an upstream side of the pig, whereby said pig may be transported along at least part of said pipeline by the resultant pressure differential between said upstream and downstream sides thereof.

These and other preferred and optional aspects and features of the invention are defined in the Claims appended hereto.

Figure 2:
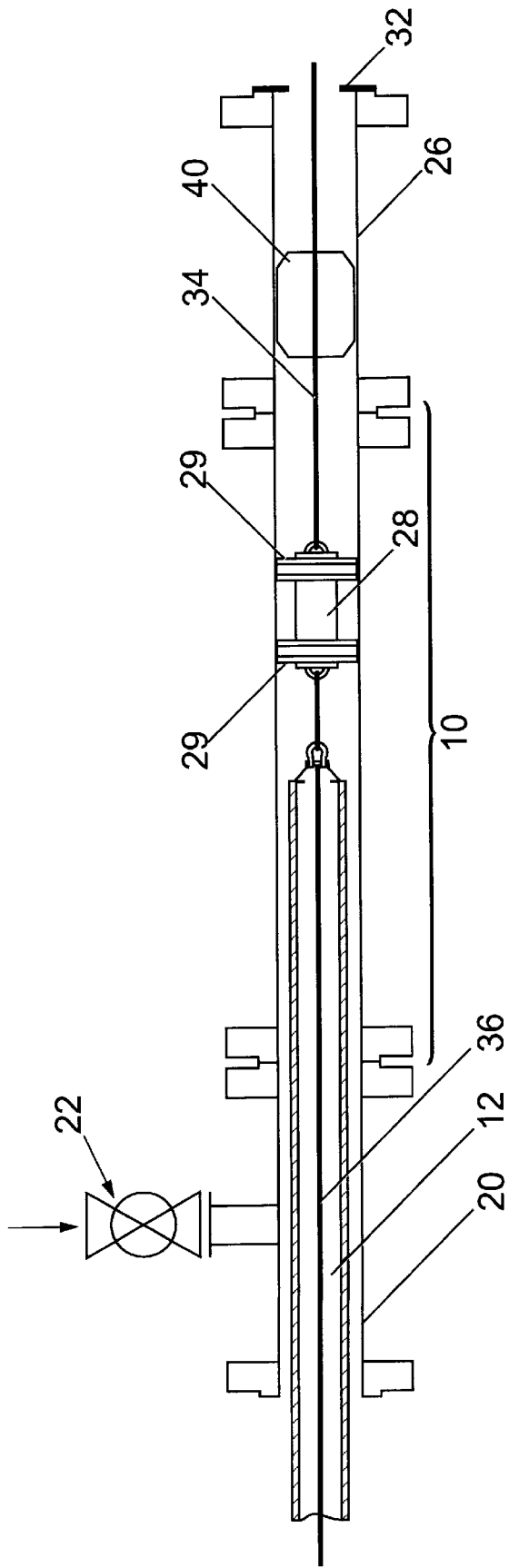

Embodiments of the invention will now be described, with reference to the accompanying drawings in which:

FIG. 1 is a schematic illustration of a liner being installed in a subsea pipeline, in accordance with a preferred embodiment of the invention; and FIG. 2 is a generalised, schematic illustration of pipe lining systems in accordance with the invention.

FIG. 1 shows a length of pipeline 10 in which a liner 12 (typically formed from a polymer material such as HDPE) is to be installed. In the drawing, the liner 12 is being fed from left to right; the left hand end of the pipeline 10 will be referred to as the "upstream" end and the right hand end as the "downstream" end. In this example, the liner is being installed in a pipeline which has previously been installed in a subsea location. It will be understood that the invention is also applicable to pipelines other than subsea pipelines and/or to subsea pipelines prior to installation of the pipeline, as shall be discussed further below.

In the illustrated example of FIG. 1, the liner 12 is fed into the upstream end of the pipeline 10 by means of a temporary, flexible, liner feed pipe 14 (or "inlet riser") which extends from a support vessel 16 on the surface 18 and is connected to the upstream end of the pipeline 10 via an additional pipe section 20, which includes a valve 22 in its side wall. In this example, the downstream end of the pipeline is connected to an existing riser 24, via a further additional pipe section 26.

The interior volume of the various pipes 10, 14, 20, 24 and 26 is flooded prior to insertion of the liner 12. The liner feed pipe 14 may be perforated at its inlet below sea level for this purpose.

The valve 22, when open, allows communication between the interior and exterior of the pipe section 20. It may serve simply to open the pipe to external hydrostatic pressure or it may be connected to other equipment, either subsea or at the surface, such as dosing apparatus for introducing additives to the pipeline, or to sources of fluids other than seawater. The valve is closed at the beginning of the lining operation.

A pig 28 is connected by any suitable means to the leading end of the liner 12 and is fed into the upstream end of the liner feed pipe 14. The pig 28 includes annular seals 29 adapted to form a substantially fluid-tight seal with the interior walls of the pipes through which it is to travel. Once the pig 28, towing the liner 12, has been inserted into the liner feed pipe 14, a submersible pump 30, which has been lowered into the existing riser 24, is operated to pump water out of the riser 24, thereby reducing the hydrostatic head on the downstream side of the pig 28. The pressure differential thus created between the upstream and downstream sides of the pig 28 causes the pig to be transported along the length of the pipes 14, 20, 10, and 26. The liner 12 itself is open at its ends and free-flooding.

Once the pig 28 passes the valve 22 in pipe section 20, the valve 22 may be opened to hydrostatic pressure. This eliminates the possibility of air being sucked into the inlet of the liner feed pipe 14. The downstream pipe section 26 includes a pig stop 32 which limits the travel of the pig 28. Once the pig 28 reaches the stop 32, the head in the existing riser is restored to equalise the pressure across the pig. Thereafter, the pipe sections 20 and 26 may be disconnected from the pipeline to allow the pig 28 to be retrieved and to allow the liner 12 to be terminated in a suitable manner at the ends of the pipeline 10. Additional pipe sections (not shown) may be included between the pipe section 20 and the upstream end of the pipe 10 and between the downstream end of the pipe 10 and the pipe section 26. Such additional pipe sections may include components and features such as valves for venting the annulus between the lining and the interior of the pipe and arrangements for terminating the ends of the liner, as is well known in the art, and would remain as part of the pipe 10 after removal of the pipe sections 20 and 26.

The same approach of reducing the pressure on the downstream side of the pig 28 may be employed for transporting pigs along lengths of pipeline for purposes other than the installation of liners.

The example of FIG. 1 relates particularly to an to the installation of a liner in an existing subsea pipeline, making use of an existing riser at the downstream end of the pipeline. The invention may also be applied to existing subsea pipelines where there is no existing riser in place; e.g. by installing a temporary riser at the downstream end or or by any other arrangement allowing the pressure on the downstream side of the pig to be reduced relative to the pressure on the upstream side. As noted above, the invention may also be applied to pipelines on land, in which case the pipe would be flooded during the liner installation procedure, the required pressure differential being generated by any suitable arrangement. Temporary pipe sections would be attached as in FIG. 1, configured to allow installation of the pig and liner. The technique may be applied to existing land pipelines, or to pipelines prior to installation thereof either on land or subsea.

FIG. 2 illustrates the system of the invention in more general terms than the particular example of FIG. 1, wherein features in common with FIG. 1 are designated by like reference numerals. As previously discussed, whether the liner 12 is being installed subsea or on land, the pipe is flooded and means, such as suitable pumps etc. (not shown) are provided to generate the required pressure differential across the pig 28. Variations are also possible, as follow:

(a) For the purpose of installing the liner 12, a cable tow might be employed in place of the pig 28. In this case, there would be no requirement for the generation of a pressure differential. Alternatively, as shown in FIG. 2, a cable 34 may be connected to the downstream end of the pig 28 to assist pressure-driven movement of the pig.

(b) The pig 28 might be replaced by a self-propelled "pipe crawler" unit 40, shown schematically in FIG. 2, of a type which is generally known in the art. The movement of such a unit might be assisted by a pressure differential or by a cable tow or both.

(c) As shown in FIG. 2, a cable 36 may be connected to the upstream end of the pig, allowing a constant back tension to be applied so as to allow better control of the installation process. This arrangement would also enable the prevention of excessive stresses and strains being applied to the liner in the (unlikely) event that the liner becomes stuck, and would allow the liner and pig to be pulled backwards if necessary for any reason. An upstream cable of this type might also be employed with cable tows, self-propelled crawlers or combinations as discussed at (a) and (b) above.

Improvements and modifications may be incorporated without departing from the scope of the invention.

What is claimed is:

1. A method for installing a liner in a subsea pipeline, the method comprising the steps of:

flooding the interior of the pipeline so as to apply ambient subsea hydrostatic head throughout the length of the pipeline;

pulling the liner along the length of the interior of the pipeline from an upstream end thereof to a downstream end;

connecting said liner to a pig which forms a substantially fluid-tight seal with the interior walls of the pipeline, applying said ambient hydrostatic head on both sides of the pig, and reducing the hydrostatic head on a downstream side of the pig such that the hydrostatic head on said downstream side is less than the hydrostatic head on an upstream side of the pig, whereby said pig is transported along at least part of said pipeline by the resultant pressure differential between said upstream and downstream sides of said pig and said liner is pulled along the interior of the pipeline by said pig.

2. A method as claimed in claim 1, wherein the method further comprises the steps of:

arranging an inlet riser connected to the upstream end of the pipeline in which the liner is to be installed and an outlet riser connected to the downstream end of the pipeline such that said risers each extend to the water surface and said risers and the pipeline are open to hydrostatic pressure, introducing the pig into the inlet riser, and creating said pressure differential by pumping water out of said outlet riser.

3. A method as claimed in claim 2, wherein the step of arranging the inlet riser connected to the upstream end of the pipeline comprises the step of connecting a temporary, flexible pipe to said upstream end of the pipeline.

4. A method as claimed in claim 2, wherein the step of arranging the outlet riser connected to the downstream end of the pipeline comprises the step of employing a pre-existing riser previously connected to the downstream end of the pipeline.

5. A method as claimed in claim 2, further including the step of connecting the downstream end of the inlet riser to the upstream end of the pipeline via a first temporary pipe section including a valve in a side wall thereof.

6. A method as claimed in claim 5, further including the steps of closing said valve when the pig is inserted into the riser inlet and opening said valve once the pig has passed downstream of the valve.

7. A method as claimed in claim 2, further including the step of connecting the downstream end of the pipeline to the upstream end of the outlet riser via a second temporary pipe section including a stop for limiting the travel of the pig.

8. A method as claimed in claim 1, further including the step of supplementing the hydrostatic force for pulling the liner by applying additional traction force to said pig by a cable.

9. A method as claimed in claim 1, further including the step of supplementing the hydrostatic force for pulling the liner by applying additional traction force to said pig by a self-propelled pipe crawler unit.

10. A method as claimed in claim 1, further including the step of providing a cable extending in the upstream direction from the downstream end of the liner, whereby a force may be applied in said upstream direction.

11. Apparatus for installing a liner in a subsea pipeline, comprising:

means for flooding the interior of the pipeline so as to apply ambient subsea hydrostatic head throughout the length of the pipeline; and pulling means for pulling the liner along the length of the interior of the pipeline from an upstream end thereof to a downstream end;

wherein said pulling means comprises a pig having a fluid seal means adapted to form a substantially fluid-tight seal with the interior walls of the pipeline, means for applying said ambient subsea hydrostatic head on both sides of the pig, and means for reducing the hydrostatic head on a downstream side of the pig such that the hydrostatic head on said downstream side is less than the hydrostatic head on the upstream side of the pig, whereby the liner may be pulled along at least part of said pipeline by the resultant pressure differential between said upstream and downstream sides of said pig.

12. Apparatus as claimed in claim 11, wherein said means for applying a hydrostatic head on both sides of the pig includes an inlet riser adapted to be connected to the upstream end of the pipeline in which the liner is to be installed, and an outlet riser adapted to be connected to the downstream end of the pipeline, said risers each extending to the water surface and said risers and the pipeline being open to hydrostatic pressure, in use, the pig being adapted to be introduced into the inlet riser, and further including pump means for creating said pressure differential by pumping water out of said outlet riser.

13. Apparatus as claimed in claim 12, wherein said inlet riser comprises a temporary, flexible pipe.

14. Apparatus as claimed in claim 12, wherein said outlet riser comprises a pre-existing riser.

15. Apparatus as claimed in claim 12, further including a first temporary pipe section whereby the downstream end of the inlet riser may be connected to the upstream end of the pipeline, said first temporary pipe section including valve means in the side wall thereof.

16. Apparatus as claimed in claim 15, wherein said valve means is closed when the pig is inserted into the riser inlet and opened once the pig has passed downstream of the valve means.

17. Apparatus as claimed in claim 12, further including a second temporary pipe section, whereby the downstream end of the pipeline may be connected to the upstream end of the outlet riser, said second temporary pipe section including stop means for limiting the travel of the pig.

18. Apparatus as claimed in claim 11, wherein the hydrostatic force for pulling the liner is supplemented by an additional traction force applied by means of a cable.

19. Apparatus as claimed in claim 11, wherein the hydrostatic force for pulling the liner is supplemented by an additional traction force applied by means of a self-propelled pipe crawler unit.

20. Apparatus as claimed in claim 11, wherein a cable is provided extending in the upstream direction from the downstream end of the liner, whereby a force may be applied in said upstream direction.

21. A method for transporting a pig along the interior of subsea pipeline, the method comprising the steps of:

forming a substantially fluid tight seal between the pig and the interior walls of the pipeline, applying ambient subsea hydrostatic head on both sides of the pig, and reducing the hydrostatic head on a downstream side of the pig such that the hydrostatic head on said downstream side is less than the hydrostatic head on an upstream side of the pig, whereby said pig is transported along at least part of said pipeline by the resultant pressure differential between said upstream and downstream sides thereof.

22. Apparatus for transporting a pig along the interior of a subsea pipeline, comprising:

a pig having fluid seal means adapted to form a substantially fluid-tight seal with the interior walls of the pipeline, means for applying ambient subsea hydrostatic head on both sides of the pig, and means for reducing the hydrostatic head on a downstream side of the pig such that the hydrostatic head on said downstream side is less than the hydrostatic head on an upstream side of the pig, whereby said pig may be transported along at least part of said pipeline by the resultant pressure differential between said upstream and downstream sides thereof.

\* \* \* \* \*